United States Patent [19]

Lupke et al.

[11] 4,199,314
[45] Apr. 22, 1980

[54] APPARATUS FOR PRODUCING THERMOPLASTIC TUBING

[76] Inventors: Gerd P. H. Lupke, 46 Stornoway Cres.; Manfred A. A. Lupke, 35 Ironshield Cres., both of Thornhill, Canada

[21] Appl. No.: 855,409

[22] Filed: Nov. 28, 1977

[30] Foreign Application Priority Data

Dec. 1, 1976 [CA] Canada ................................ 266970

[51] Int. Cl.² .......................... B29F 3/08; B29F 3/03
[52] U.S. Cl. ................................... 425/532; 425/326.1; 425/392; 425/396; 425/537; 425/539; 425/812
[58] Field of Search ................. 264/99, 209; 249/141, 249/113, 135; 425/812, 537, 532, 539, 396, 381, 466, 371, 326.1, 525, 387.1, 437, 392

[56] References Cited

U.S. PATENT DOCUMENTS

| 3,008,203 | 11/1961 | Dagenhard | 249/141 X |
|---|---|---|---|
| 3,262,159 | 7/1966 | Falkenau et al. | 425/812 X |
| 3,287,807 | 11/1966 | Menke | 249/135 X |
| 3,309,443 | 3/1967 | Scott, Jr. et al. | 425/532 X |
| 3,751,541 | 8/1973 | Hegler | 425/326.1 X |
| 3,981,663 | 9/1976 | Lupke | 425/326.1 |

FOREIGN PATENT DOCUMENTS 45-22027 7/1970 Japan .......................... 425/437

*Primary Examiner*—Mark Rosenbaum

*Attorney, Agent, or Firm*—Ridout & Maybee

[57] ABSTRACT

In apparatus for producing corrugated thermoplastic tubing and which comprises a pair of complementary upper and lower mold assemblies each having an endless array of articulately interconnected mold blocks which are driven along a forward run and back along a return run, the mold blocks co-operatively interengaging in pairs along said forward run to form an axially extending tubular mold tunnel, there is disposed at the entrance to the tunnel an extrusion head having an inner core member and an outer member which surrounds the core member and is spaced therefrom to define therebetween an annular passage terminating in an annular orifice and through which the tubing of thermoplastic material is extruded for expansion by blow molding within the tubular mold tunnel, the annular orifice having portions of increased width in axial alignment with the locations of interengagement between the mold blocks of the mold assemblies in the forward runs thereof, thereby to provide the tubing with thickened portions at these otherwise weak locations. In each mold block passages extend between the bases of the troughs of the corrugations and the exterior of the mold block, these passages which communicate with the base of each trough throughout the length thereof serving to permit the escape of any atmospheric air which is trapped by the tubing in the troughs during the blow molding thereof.

2 Claims, 13 Drawing Figures

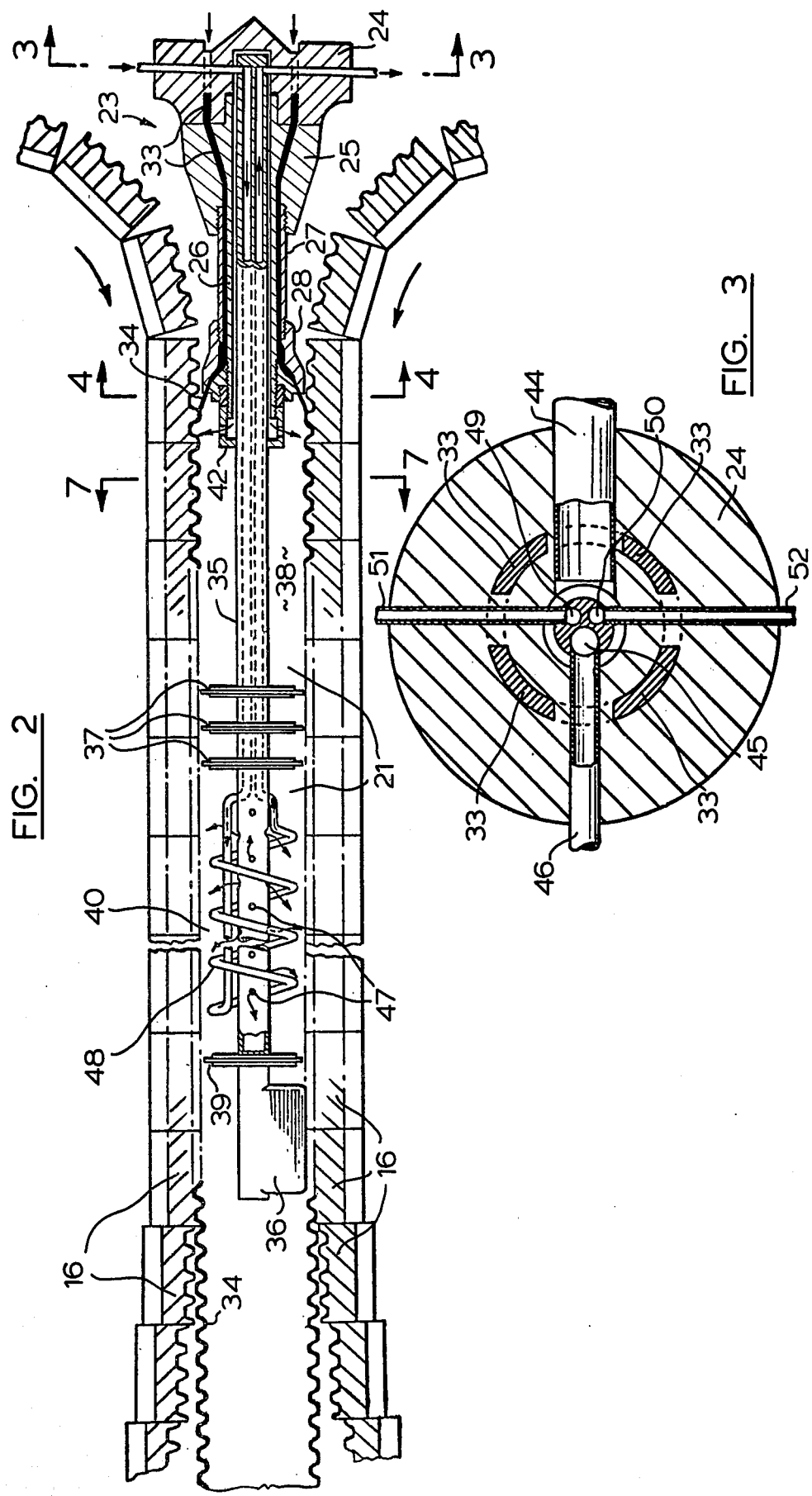

APPARATUS FOR PRODUCING THERMOPLASTIC TUBING

This invention is concerned with apparatus for producing thermoplastic tubing, the apparatus being of the type in which tubing of the thermoplastic material is operatively continuously extruded into a tubular mold tunnel in which the tubing is expanded by blow molding. The tubular mold tunnel is defined by cooperatively interengaged mold blocks of a pair of mold assemblies, the mold blocks of each mold assembly being driven along a forward run in which the blocks define the tubular mold tunnel, and back along a return run. Such an apparatus is disclosed in, for example, U.S. Pat. No. 3,981,663 issued on Sept. 21, 1976 to Gerd P. H. Lupke.

It will be appreciated that in the blow molding of the thermoplastic tubing the thermoplastic material of the tubing tends of course to be deformed at the axially extending mold parting lines between the cooperating mold blocks at the locations of interengagement between these blocks. This effect, which is more significant if the cooperatively interengaged blocks defining the tubular mold tunnel are slightly misaligned or if the mold blocks have become worn, results in the provision in the finished tubing of axially extending seam-like lines which constitute locations of weakness in the finished tubing, particularly if the finished tubing is subjected to bending. It is a primary object of one aspect of the present invention to provide apparatus of the type hereinbefore described in which this disadvantage is substantially obviated or mitigated.

According to this one aspect of the present invention there is provided apparatus for producing thermoplastic tubing, the apparatus comprising a pair of complementary mold assemblies each of which has an endless array of articulately interconnected mold blocks, drive means operatively associated with said mold assemblies for driving the mold blocks of each mold assembly in synchronism with the mold blocks of the other mold assembly along a forward run in which the mold blocks of the mold assemblies are in cooperative interengagement to provide an axially extending tubular mold tunnel, and back along a return run, an extrusion head disposed at the entrance to the tubular mold tunnel for forming a tube of thermoplastic material, and gas pressure means for urging said tube outwardly against the cooperatively interengaged mold blocks forming the tunnel. The extrusion head comprises an inner core member and an outer member surrounding the core member and spaced therefrom to define therebetween an annular passage terminating in an annular orifice. The annular orifice has portions of increased width in axial alignment with the locations of interengagement between the mold blocks of the mold assemblies in the forward runs thereof.

Apparatus of the type hereinbefore described may be used fo producing thermoplastic tubing which is corrugated, in which case the tubular mold tunnel is of corrugated form defined by alternating crests and troughs. It is, however, a disadvantage of producing corrugated thermoplastic tubing in such apparatus that as the extruded tubing of thermoplastic material is expanded by blow molding within the tubular mold tunnel there is a tendency for atmospheric air to become trapped by the tubing within the troughs, with resultant misforming of the tubing within the troughs. It is a primary object of a further aspect of the present invention to provide apparatus of the type hereinbefore described which is for producing corrugated thermoplastic tubing and in which this disadvantage is substantially obviated or mitigated.

According to this further aspect of the present invention there is provided apparatus for producing corrugated thermoplastic tubing, the apparatus comprising a pair of complementary mold assemblies each of which has an endless array of articulately interconnected mold blocks, drive means operatively associated with said mold assemblies for driving the mold blocks of each mold assembly in synchronism with the mold blocks of the other mold assembly along a forward run in which the mold blocks of the mold assemblies are in cooperative interengagement to provide an axially extending tubular mold tunnel of corrugated form defined by alternating crests and troughs, and back along a return run, an extrusion head disposed at the entrance to the tubular mold tunnel for forming a tube of thermoplastic material, and gas supply means for supplying pressurized gas to the interior of the tube of thermoplastic material within the tubular mold tunnel for urging said tube outwardly against the cooperatively interengaged mold blocks forming the tunnel. In each mold block passages extend between the bases of the troughs of the corrugations and the exterior of the mold block, these passages communicating with the base of each trough throughout the length thereof.

According to this further aspect of the present invention there is also provided a mold block for use in apparatus as described in the immediately preceding paragraph.

In order that the present invention may be more clearly understood and more readily carried into effect the same will now, by way of example, be more fully described with reference to the accompanying drawings in which FIG. 1 is a side view of apparatus according to a preferred embodiment of the invention;

FIG. 2 is a vertically sectioned view, on an enlarged scale, of a portion of the apparatus shown in FIG. 1;

FIG. 3 is a sectioned view, on a further enlarged scale, on the line 3—3 of FIG. 2;

Figure 1:
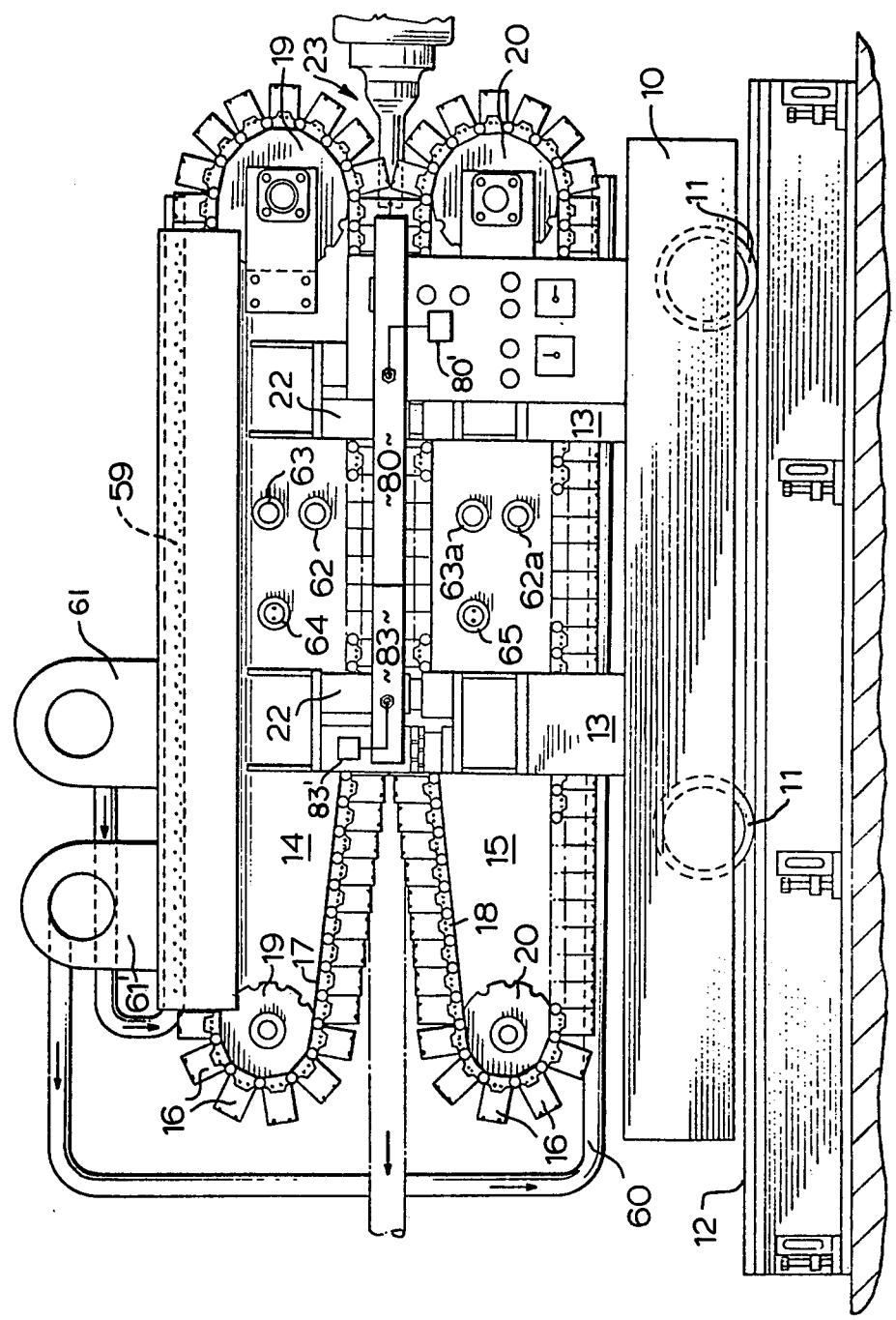

Referring to the drawings and more particularly to FIG. 1 thereof, the apparatus comprises a wheeled structure including a carriage 10 having wheels 11 which run on tracks 12. A support structure 13 which is mounted on the carriage 10 supports a pair of complementary upper and lower mold assemblies 14 and 15, respectively, each mold assembly 14 and 15 comprising an endless array of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed links of these chains. The mold assembly 15 likewise further comprises a pair of endless conveyor chains (only one of which is shown in the drawings and is denoted by the reference numeral 18), with each mold block 16 of the assembly 15 extending transversely between opposed links of this pair of chains including the chain 18. The chains are entrained around drive sprockets 19 and 20, with drive means (not shown) being connected to at least one of the sprockets 19 and at least one of the sprockets 20 for operatively driving the mold blocks 16 of each assembly 14 and 15 in synchronism along a forward run and back along a return run, the mold blocks 16 of the assemblies 14 and 15 being, in the forward runs, in cooperative interengagement to define an axially extending tubular mold tunnel 21 (FIG. 2).

The support structure 13 includes mechanical jacks 22 interconnecting the upper and lower mold assemblies 14 and 15 and operable for raising the upper assembly 14 from the lower assembly 15, when required, to permit easy access for servicing.

By means of the wheeled carriage 10 the mold assemblies 14 and 15 are operatively positioned to locate an extrusion head 23 at the entrance to the tubular mold tunnel 21, the extrusion head 23 being operatively coupled to the nozzle of an extrusion machine which may be of conventional form. If required, the mold assemblies 14 and 15 can be moved away from the extrusion head 23 by movement of the wheeled carriage 10 along the tracks 12 in order to provide access to the extrusion head 23.

The extrusion head 23 comprises a member 24 to which is co-axially mounted a member 25, the member 25 having an axially extending tubular portion 26 which is surrounded in spaced relationship thereto by a tubular member 27 one end portion of which is screw-threadedly connected to the member 25 and the other end portion of which screw-threadedly supports an outer member 28. An inner core member 29 is mounted on the portion 26 of the member 25 within the member 28, the core member 29 being spaced from the member 28 to define therebetween an annular passage 30 of generally frusto-conical form which terminates in an annular orifice 31 and which communicates with the annular space 32 between the tube 27 and the portion 26 of the member 25. This annular space 32, in turn, communicates through passages 33 in the member 25 and the member 24 with the nozzle of the extrusion machine for operatively permitting tubing 34 of thermoplastic material to be extruded from the annular orifice 31 into the tubular mold tunnel 21.

Mounted within the extrusion head 23 and extending therefrom within the tubular mold tunnel 21 is an elongated member 35 the end of which remote from the extrusion head 23 has a rider 36 which operatively rests on the internal surface of the molded tubing 34 to support said end of the member 35. The member 35 carries a first baffle constituted by three annular seals 37 which are spaced axially from the extrusion head 23 to define therewith a first zone 38 within the tubular mold tunnel 21, and a second baffle constituted by an annular seal 39 which is spaced from the first baffle to define therewith a second zone 40 within the tubular mold tunnel 21.

Within the extrusion head 23 there is provided an annular space 41 between the member 35 and the portion 26 of the member 25, this space 41 communicating at the end thereof adjacent to the tubular mold tunnel 21 with a chamber 42 which is screw-threadedly mounted on the free end of the portion 26 of the member 25 and which has radially disposed outlet ports 43. The annular space 41 communicates through an air inlet pipe 44 mounted in the member 24 with a source of pressurized gas, such as air, for operative flow of pressurized air to the zone 38 of the tubular mold tunnel 21. This flow of pressurized air to the zone 38 urges the tubing 34 of thermoplastic material which is extruded from the annular orifice 31 of the extrusion head 23 outwardly against the cooperatively interengaged mold blocks 16 defining the tunnel 21 thereby to blow mold the tubing 34, the cooperatively interengaged mold blocks 16 defining the tunnel 21 moving along the forward runs thereof to convey the tubing 34 as it is formed away from the extrusion head 23.

The member 35 has an axially extending duct 45 which communicates through an air inlet pipe 46 mounted in the member 24 with a source of cooling air, the duct 45 also communicating through openings 47 in the member 35 with the zone 40 of the tubular mold tunnel 21 so that cooling air may operatively be discharged into the zone 40 for cooling and setting the thermoplastic material of the tubing 34. To assist cooling of this cooling air a cooling coil 48 is mounted on the member 35 within the zone 40 and communicates with a pair of ducts 49 and 50 provided within the member 35, inlet and outlet connections 51 and 52 for cooling fluid being connected to these ducts 49 and 50, respectively.

According to one aspect of the present invention the annular orifice 31 of the extrusion head 23 has portions of increased width in axial alignment with the locations of interengagement between the mold blocks 16 of the assemblies 14 and 15 in the forward runs thereof, these portions of increased width of the annular orifice 31 being provided by grooves 53 which are formed in the face of the core member 29 which bounds the annular passage 30, although alternatively these portions of increased width of the annular orifice 31 may be provided by grooves 54 formed in the face of the outer member 28 which bounds the annular passage 30, or may be provided by grooves 53 and 54 in the faces of the core member 29 and the outer member 28 which bound the annular passage 30. The portions of the annular orifice 31 of increased width result in the thermoplastic tubing 34 having axially extending portions 55 of increased thickness which thus serve to strengthen the tubing 34 at the locations of the interengagement between the mold blocks 16 of the assemblies 14 and 15, these locations otherwise tending to be locations of weakness in the tubing 34 as hereinbefore described.

Figure 4:
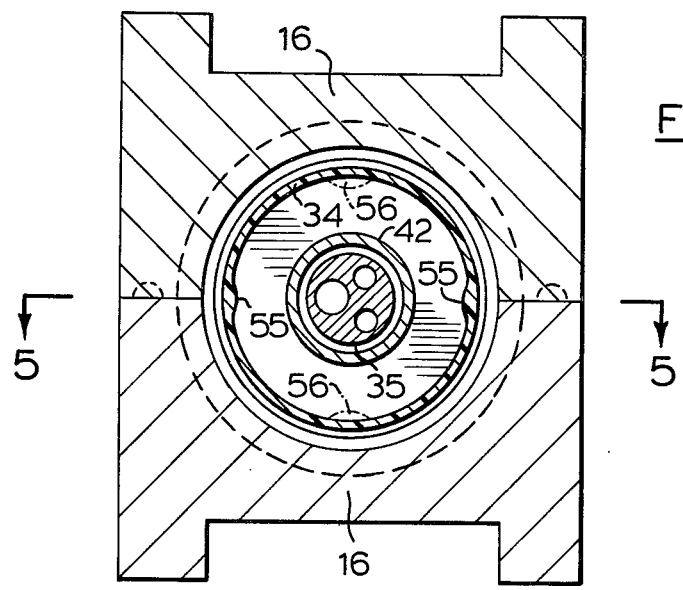
FIG. 4 is a sectioned view, on said further enlarged scale, on the line 4—4 of FIG. 2.
Figure 5:
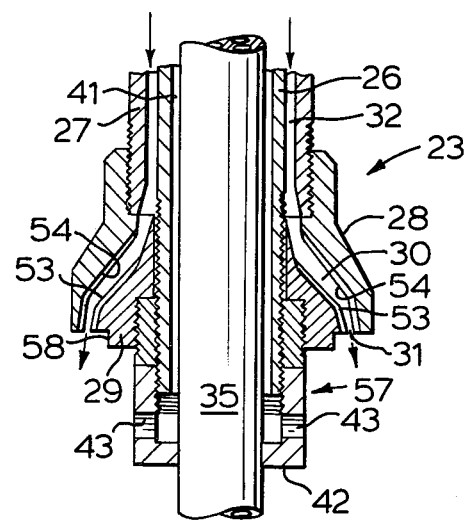
FIG. 5 is a sectioned view, again on said further enlarged scale, of a portion of an extrusion head incorporated in the apparatus, generally on the line 5—5 in FIG. 4.

As shown in FIG. 4 the tubing 34 may be provided with one or more additionally axially extending portions 56 of increased thickness by providing the annular orifice 31 of the extrusion head 23 with correspondingly located additional portions of increased width.

An adjustment nut 57 is screw-threadedly mounted on the portion 26 of the member 25 with the core member 29 being screw-threadedly mounted on this nut 57. The core member 29 is provided with flats 58 or the like by means of which the core member 29 may be restrained against rotation while the nut 57 is operatively rotated to move the core member 29 towards or away from the outer member 28 thereby to vary the width of the annular orifice 31 while retaining the portions of the annular orifice 31 of increased width in axial alignment with the locations of interengagement between the mold blocks 16 of the assemblies 14 and 15.

As shown in FIG. 1, each mold assembly 14, 15 may further comprise an air distributing duct 59, 60 extending along the return run of the mold blocks 16 of the respective mold assembly 14 or 15 and positioned to distribute cooling air to the exposed interior surfaces of the mold blocks 16 as they travel along the return run. The distributing ducts 59, 60 are each connected to a respective blower 61, 61 by which the cooling air is supplied to them. Each mold assembly 14, 15 further comprises a heat sink provided by a tank through which cooling water may be circulated, inlet and outlet water connections 62, 63 and 62a, 63a being shown. The mold assembly housings may be cooled in this manner during a molding operation; however, in order to avoid wastage of material at the commencement of a molding operation, the water in the housings may be preheated to the required temperature by electrical immersion heaters mounted in the walls of the housings as shown at 64, 65.

Figure 6:
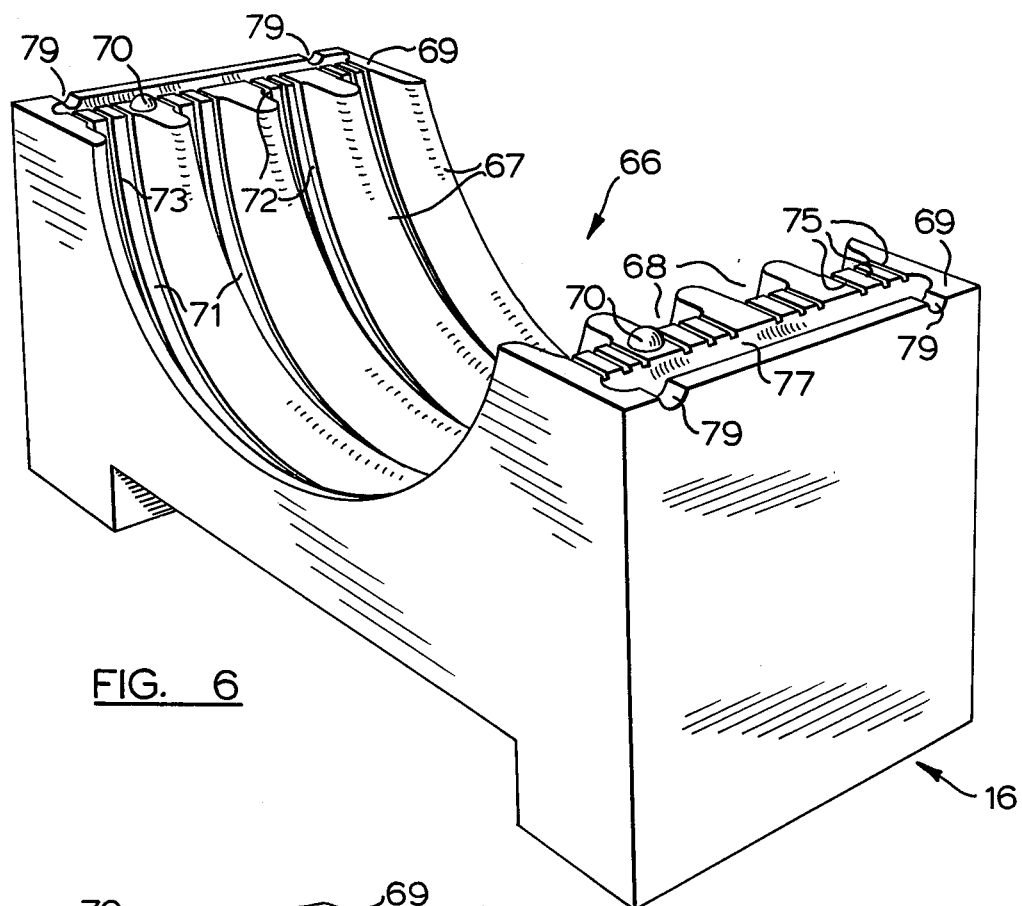
FIG. 6 is a perspective view, on a still further enlarged scale, of a representative one of the mold blocks incorporated in the apparatus shown in the preceding views.
Figure 7:
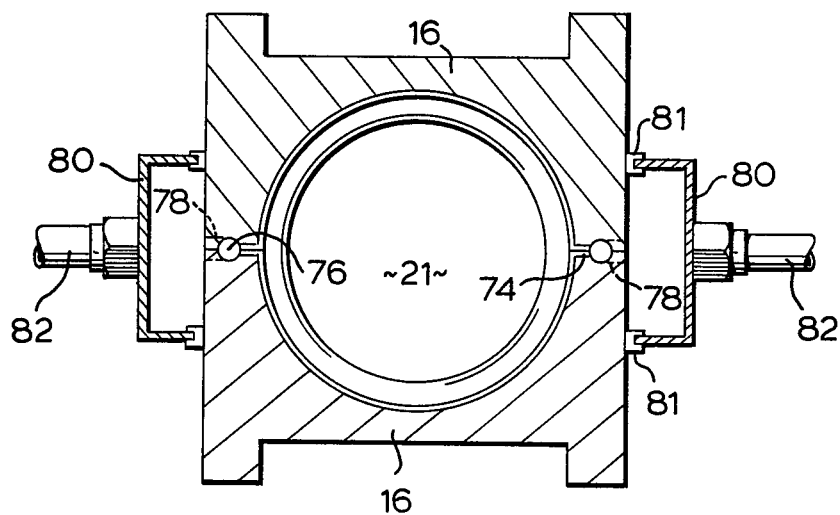
FIG. 7 is a sectioned view of two cooperatively interengaged mold blocks as shown in FIG. 6.

Referring particularly to FIGS. 6 and 7, it will be noted that each mold block 16 is of generally rectangular shape having a pair of end faces, side and bottom faces, and a top face which is provided with a hemi-cylindrical recess 66 contoured to provide a corrugated mold wall defined by alternating crests 67 and troughs 68. As shown in FIG. 6 the top face 69 of the block 16 is provided with a pair of locating pins 70 one of which is disposed on each side of the hemi-cylindrical recess 66, these pins 70 being adapted to register with correspondingly shaped sockets in the complementary top face 69 of a cooperating mold block 16 of the other mold assembly 14 or 15.

During the blow molding of the thermoplastic tubing 34 there is, as hereinbefore described, a tendency for atmospheric air to be trapped by the tubing 34 in the troughs 68, this entrapped air preventing proper molding of the tubing 34 in the troughs 68, and particularly in the corners at the bases 71 of the troughs 68. As is most clearly shown in FIG. 6 a continuous groove 72 is provided in each corner of the base 71 of each trough 68. An additional groove 73 may also be provided in the base 71 of each trough 68 between the corner grooves 72. These grooves 72 and 73 communicate with the exterior of the mold block 16 through, with reference to the preferred embodiment shown in FIGS. 6 and 7, passages 74 constituted by mating grooves 75 in the top faces 69 of the cooperatively interengaging mold blocks 16, axially extending manifold recesses 76 constituted by further mating grooves 77 in the top faces 69 of the cooperatively interengaging mold blocks 16, and ports 78 constituted by mating recesses 79 in the top faces 69 of the cooperatively interengaging mold blocks 16.

A stationary suction chamber 80 may be mounted on each side of the forward runs of the mold blocks 16 of the assemblies 14 and 15, each chamber 80, which has a resilient sealing edge portion 81 bearing against the side faces of the mold blocks 16, communicating with the ports 78 and being connected through a pipe 82 to a suction source 80' shown diagrammatically in FIG. 1, thereby to extract atmospheric air trapped in the troughs 68 and particularly air trapped at the corners of the bases 71 of the troughs 68 in order to ensure proper forming of the thermoplastic tubing 34 therein.

A stationary pressure chamber 83 which corresponds in structure to each of the stationary suction chambers 80 may be mounted on each side of the forward runs of the mold blocks 16 of the assemblies 14 and 15, each pressure chamber 83 as shown in FIG. 1 being disposed downstream of the adjacent suction chamber 80 and communicating with the ports 78 during continued movement of the mold blocks 16 beyond the suction chamber 80. Each pressure chamber 83 is connected to a source 83' of pressurized fluid such as pressurized air which serves after the cooling and setting of the thermoplastic tubing 34 has been completed positively to urge the tubing 34 out of the mold blocks 16, the source 83' being shown diagrammatically in FIG. 1.

Figure 8:
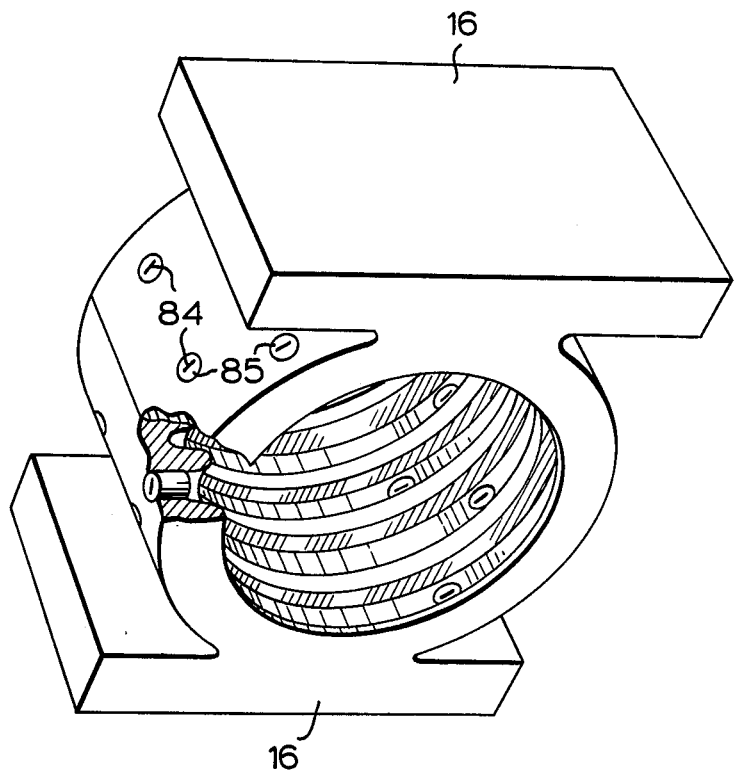
FIG. 8 is a view of two cooperatively interengaged mold blocks according to an alternative embodiment.
Figure 9:
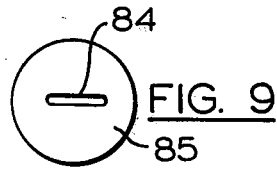
FIG. 9 is a top view of one form of plug shown in FIG. 8.
Figure 10:
FIG. 10 is a side view of the plug shown in FIG. 9.
Figure 11:
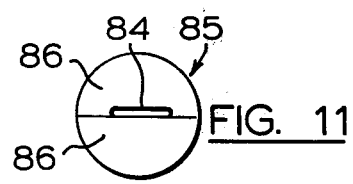
FIG. 11 is a top view corresponding to FIG. 9 of an alternative form of plug.
Figure 12:
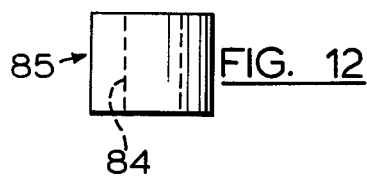
FIG. 12 is a side view of this alternative form of plug shown in FIG. 11.

FIG. 8 shows an alternative embodiment in which throughout the length of the base 71 of each trough 68 each mold block 16 is provided with a series of slits 84 disposed in the corners of the base 71 of the trough 68, these slits 84 communicating with the exterior of the mold block 16 in order again to permit atmospheric air which is operatively trapped in the troughs 68, and particularly at the corners of the base 71 of each trough 68, to escape. The slits 84 may be formed through each mold block 16 by a spark erosion technique, or alternatively as is shown in FIG. 8 each slit 84 may be formed through a plug 85 which is mounted in a hole in the mold block 16. Such a plug 85 with the slit 84 formed therethrough is shown in FIGS. 9 and 10. FIGS. 11 and 12 show an alternative form of this embodiment of the invention in which each plug 85 is in two parts 86 with a groove which constitutes the slit 84 being provided as, for example, by a milling operation in one of the mating faces of the two parts 86 of the plug 85, although it will of course be appreciated that mating grooves could be formed in both mating faces of the two parts 86 of the plug 85.

Thus, the grooves 72 and 73, the manifold recesses 76 and the ports 78 (FIGS. 6 and 7) or the slits 84 (FIGS. 8, 9, 10, 11 and 12) constitute passages which, according to a further aspect of the present invention, extend between the bases 71 of the troughs 68 of the corrugations and particularly the corners of these bases 71, and the exterior of the associated mold block 16, with these passages communicating with the base 71 of each trough 68 throughout the length thereof. The grooves 72, 73 and slits 84 are sufficiently narrow in width substantially to prevent any of the thermoplastic material of the tubing 34 operatively being forced into these grooves 72, 73 or slits 84. The grooves 72, 73 and slits 84 may each have a width of approximately 0.020 inches, and the length of each slit 84 may be approximately 0.500 inches.

According to an alternative embodiment of this further aspect of the present invention each mold block 16 is of sintered metal which is porous to gas flow, the pores constituting the above-mentioned passages in the mold blocks 16.

Figure 13:
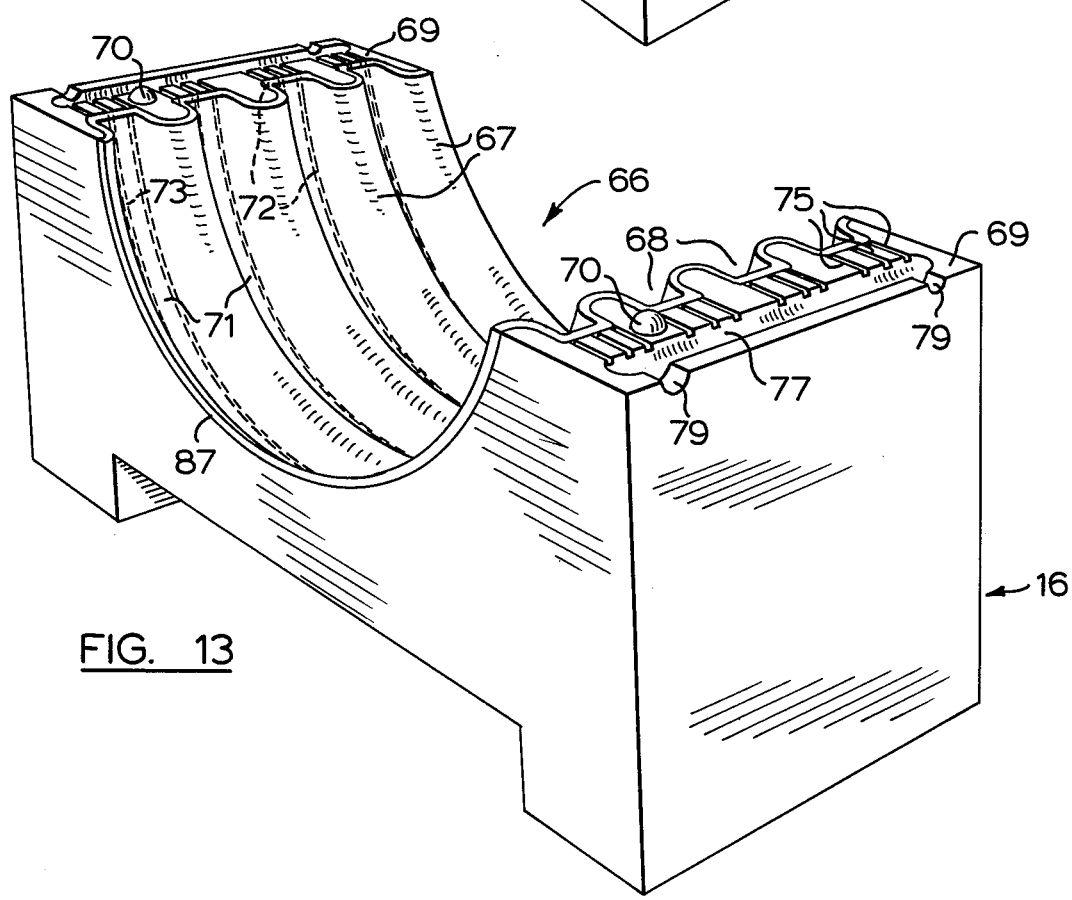
FIG. 13 is a view corresponding to FIG. 6 of a mold block according to a further alternative embodiment.

In FIG. 13 there is shown a mold block 16 according to a further alternative embodiment of this further aspect of the invention. The mold block 16 shown in FIG. 13 is identical to that shown in FIG. 6 and corresponding reference numerals are used to denote corresponding parts, except that the hemi-cylindrical recess 66 is provided with a liner 87 of sintered metal which is porous to gas flow, the liner 87 overlying the grooves 72, 73 which constitute channels which are preferably considerably wider than the grooves 72, 73 as hereinbefore described with reference to FIGS. 6 and 7 since of course the presence of the liner 87 prevents the thermoplastic material of the tubing 34 being forced into these channels. Thus according to this embodiment of this further aspect of the invention, in each mold block 16 the troughs 68 of the corrugations are provided with channels which communicate with the exterior of the mold block 16, the channels being covered by the liner 87 of sintered metal which is porous to gas flow, with the pores in the sintered metal liner together with the channels constituting the above-described passages in the mold block 16.

We claim:

1. Apparatus for producing corrugated thermoplastic tubing, the apparatus comprising a pair of complementary mold asssemblies each of which has an endless array of articulately interconnected mold blocks, drive means operatively associated with said mold assemblies for driving the mold blocks of each mold assembly in synchronism with the mold blocks of the other mold assembly along a forward run in which the mold blocks of the mold assemblies are in cooperative interengagement to provide an axially extending tubular mold tunnel of corrugated form defined by alternating crests and troughs, and back along a return run, an extrusion head disposed at the entrance to the tubular mold tunnel for forming a tube of thermoplastic material, and gas supply means for supplying pressurized gas to the interior of the tube of thermoplastic material within the tubular mold tunnel for urging said tube outwardly against the cooperatively interengaged mold blocks forming the tunnel, wherein in each mold block passages extend between the bases of the troughs of the corrugations and the exterior of the mold block, these passages which communicate with the base of each trough throughout the length thereof comprising continuous grooves which extend along the bases of the troughs of the corrugations, with these grooves in each mold block communicating with a manifold recess which is provided in the mold block and which communicates with the exterior of the mold block through port means, a stationary suction chamber which is connected to a suction source being so positioned as to communicate with said port means during movement of the mold blocks along the forward runs, and a stationary pressure chamber which is connected to a source of pressurized fluid being so positioned downstream of the suction chamber as to communicate with said port means during continued movement of the mold blocks beyond the suction chamber along the forward runs.

2. Apparatus according to claim 1, wherein the passages communicate with the bases of the troughs at the corners thereof.

* * * * *